(12) United States Patent
Bucheru

(10) Patent No.: US 9,517,840 B2
(45) Date of Patent: Dec. 13, 2016

(54) SEMI-OPEN FLUID JET VTOL AIRCRAFT

(71) Applicant: Bogdan Tudor Bucheru, San Jose, CA (US)

(72) Inventor: Bogdan Tudor Bucheru, San Jose, CA (US)

( * ) Notice: Subject to any disclaimer, the term of this patent is extended or adjusted under 35 U.S.C. 154(b) by 567 days.

(21) Appl. No.: 14/099,929

(22) Filed: Dec. 7, 2013

(65) Prior Publication Data

US 2016/0009376 A1 Jan. 14, 2016

Related U.S. Application Data

(60) Provisional application No. 61/735,038, filed on Dec. 9, 2012.

(51) Int. Cl.
| | | |
|---|---|---|
| B64C 39/00 | (2006.01) | |
| B64C 39/06 | (2006.01) | |
| B64C 29/00 | (2006.01) | |

(52) U.S. Cl.
CPC ......... B64C 39/064 (2013.01); B64C 29/0025 (2013.01); B64C 39/066 (2013.01)

(58) Field of Classification Search
CPC ............. B64C 29/0008; B64C 29/0016; B64C 29/0025; B64C 29/0041; B64C 29/0058; B64C 37/00; B64C 39/06; B64C 39/062; B64C 39/064

See application file for complete search history.

(56) References Cited

U.S. PATENT DOCUMENTS

| | | | | | |
|---|---|---|---|---|---|
| 3,053,483 | A | * | 9/1962 | Stahmer | B64C 23/005 244/29 |
| 3,107,071 | A | * | 10/1963 | Wessels | B64C 39/001 180/129 |
| 3,489,374 | A | * | 1/1970 | Morcom | B64C 39/06 244/12.2 |
| 4,941,628 | A | * | 7/1990 | Sakamoto | B64C 39/064 244/12.2 |
| 5,054,713 | A | * | 10/1991 | Langley | B64C 39/001 244/12.2 |
| 5,203,521 | A | * | 4/1993 | Day | B64C 39/064 244/12.2 |
| 5,303,879 | A | * | 4/1994 | Bucher | B64C 29/0025 244/12.2 |
| 5,503,351 | A | * | 4/1996 | Vass | B64C 39/064 244/12.2 |
| 6,073,881 | A | * | 6/2000 | Chen | B64C 39/001 244/12.2 |

(Continued)

FOREIGN PATENT DOCUMENTS

| | | | |
|---|---|---|---|
| KZ | 23001 | * | 10/2010 |
| WO | WO2005/113981 | * | 12/2005 |
| WO | WO2012/091533 | * | 7/2012 |

Primary Examiner — Justin Rephann
(74) Attorney, Agent, or Firm — Pierson IP, PLLC

(57) ABSTRACT

The herein invention is presenting a lift generating method based on a semi-open fluid jet flowing in a closed circuit around a lifting airfoil. A VTOL aircraft with maximized pay load room and car-like shape is the preferred embodiment of the invention. The herein aircraft uses no wings, exposed propellers, hot gas jets or other high injury risk means for propulsion and lift, and it can be driven by ordinary skilled people. Furthermore the aircraft has a small footprint and can land, take off and even cruise on water in one of the preferred embodiments.

5 Claims, 4 Drawing Sheets

(56) References Cited

U.S. PATENT DOCUMENTS

| | | | | |
|---|---|---|---|---|
| 6,270,036 B1* | 8/2001 | Lowe, Jr. | ............... | B64C 39/001 244/12.2 |
| 6,375,117 B1* | 4/2002 | Cain | ................... | B64C 29/0058 244/23 C |
| 6,669,138 B1* | 12/2003 | Arrieta | .................. | B64C 39/064 244/12.2 |
| 7,147,183 B1* | 12/2006 | Carr | ....................... | B64C 39/064 244/12.2 |
| 8,302,901 B2* | 11/2012 | Hatton | .................... | B64C 17/00 244/12.2 |
| 8,308,104 B2* | 11/2012 | Brothers | ................. | F02C 3/107 244/12.2 |
| 2002/0125366 A1* | 9/2002 | Salas | ........................ | B60V 1/02 244/12.1 |
| 2005/0205715 A1* | 9/2005 | Hansen | ................... | B64C 27/20 244/12.13 |
| 2011/0042507 A1* | 2/2011 | Seiford, Sr. | ............... | B60F 5/02 244/2 |
| 2013/0112804 A1* | 5/2013 | Zhu | ..................... | B64C 29/0025 244/2 |
| 2013/0181095 A1* | 7/2013 | Akhmejanov | ........ | B64C 39/062 244/23 C |

\* cited by examiner

US 9,517,840 B2

SEMI-OPEN FLUID JET VTOL AIRCRAFT

RELATED APPLICATION/CLAIM OF PRIORITY

This application is related to and claims priority from U.S. provisional application Ser. No. 61/735,038, filed Dec. 9, 2012, which provisional application is incorporated by reference herein.

FIELD OF THE INVENTION

This invention relates to flying method and apparatus for devices heavier than air and capable of vertical take-off and landing (VTOL), with extended application to any kind of fluid (e.g. water), by using semi-open fluid jet blowing around a lifting airfoil.

BACKGROUND OF THE INVENTION

The system of blowing gases on an open surface for producing vertical thrust has been used in the past for generating lift or enhancing the lift produced by wings.

In a more general idea, the main physical phenomena used to create lift are conservation of momentum (CM), Bernoulli law (BL), Coandă effect (CE) and ground effect (GE).

The main flying methods used or proposed in the past can be classified in five categories: rockets (a) that are based on (CM); airplanes or winged devices (b) that are in popular references based on (BL) for lift, although more accurate explanations prefer the vorticity (CM) as the cause of the lift over the Bernoulli effect; helicopters (c) that use primarily (CM); hovercrafts and lift platforms (d) that use (GE) as the main lift source; open lifting surface aircrafts (e) that use (BL) and (CE) for achieving lift.

While rockets are suitable mostly for one-time flight, with mainly military and space applications, airplanes and helicopters have become popular transportations means; however there are several drawbacks that have kept them from becoming more universally accessible, e.g. in a car like manner.

Both airplanes and helicopters necessitate highly trained pilots and have big footprint in comparison with the useful cabin space—big wings and tail for airplanes, big propeller and tail for helicopters. Both airplanes and helicopters have high speed moving exposed propeller blades, and in some cases high speed hot gas jets when jet engines are used. In the case of airplanes a long take off run is necessary, bringing the need for well built and maintained airports.

Hovercrafts have had some commercial success in the latest decades, from military applications to toys; while their shape and footprint are much closer to those of a car, they are still lacking the flexibility and the commercial accessibility of the car and the risk of exposed propellers is still present.

Some open surface aircrafts have been proposed in the past and some recently RC (radio controlled) prototype level demonstrations have been made; while the footprint is compact and the exposure to high speed moving parts is reduced, the maneuverability is also reduced and the available payload room is fairly small; furthermore, the shape of these aircraft's is circular, flying saucer like, not practical.

In conclusion, a car-like shaped aircraft is the subject of this invention, with VTOL capability and with maximized payload room, easy to control by ordinary skilled people. All these are achieved without any exposed high speed moving parts and with reduced energy consumption.

PRIOR ART

Most of the known flying methods are a combinations of one or more of the physical phenomena (CM), (BL), (CE) and (GE), resulting in aircrafts that combine one or more of the (a), (b), (e), (d) and (e) solutions. FIG. 1 presents the main concept of an airplane, where a wing 1A is attached to a body 1B that is moved by a propeller 1C. The propeller needs to continually accelerate a huge mass of air in order to exert enough thrust for maintaining the speed V of the airplane, speed that is needed to create lift across the wing.

Considering vorticity (CM) as the source of the wing lift, just a small part of the airplane speed is used for creating the lift across the wing, as only a small fraction of the used energy creates a down-push D of the surrounding air, down-push that is balanced by an up-push of the wing, which generates the lift L. Increasing the lift of the wing is a complicated engineering work, because the drag force of the wing increases at the same time with the lift force of the wing. Hence an optimum combination between high airplane speed and wing profile and surface is necessary for flying, condition that varies a lot during take off, landing and cruising.

An enhancement of the traditional airplane wing lifting capability can be achieved based on (BL) and (CE) by controlling the fluid flow on the top of the wing, as proposed in U.S. Pat. Nos. 4,447,028, 6,926,229 and 7,823,840. Following this hybrid concept, a more active solution is proposed in US published patent application US 2004/A0011923 and in U.S. Pat. No. 6,375,117, where horizontal flying and VTOL capability are proposed.

The helicopter propeller is producing vertical thrust L (lift) in the same way the airplane propeller is producing horizontal thrust. FIG. 2 shows the main concept of a helicopter, were the propeller 2A is providing lift (L) to the body 2B by applying a down trust (D) to the air, as conservation of momentum (CM) requires. The stability of the aircraft requires a counter-momentum tail propeller 2C, and variable pitch blades for propeller 2A when moving horizontally, which brings limitation at high speed.

Multi-propeller helicopters have proved increased stability and maneuverability, the four-propeller concept, being proposed in U.S. Pat. No. 3,873,049 and a variation in the more recent U.S. Pat. No. 7,857,253, where the ducted fans reduce the risk of injury due to fast moving blades. The advancement in battery technologies and digital control has made the RC aircrafts of four-propeller helicopter type a popular toy and a practical drone for military applications. The big foot-print and the danger of exposed high speed moving blades limit their applicability.

Reducing the risk of exposed propeller and improving the high speed capability of the helicopters have led to the enclosed propeller approach as proposed in U.S. Pat. Nos. 5,064,143 and 6,834,829, while U.S. Pat. No. 6,050,520 replaces the propeller with a ducted fun. The resulting aircrafts are shaped more like a flying saucer and fail to reduce the footprint of the aircraft.

Combinations of circular wings and helicopter propeller or fan have been proposed in U.S. Pat. Nos. 5,503,351 and 6,450,446, both with VTOL capability but still having big footprint and exposed fast moving parts.

A different concept is presented in US published patent application 2006/A0032972, where a circular wing is enclosed in a toroidal body, with a pair of counter-rotating fans as a regenerative air jet blowing source. Besides the unpractical flying saucer shape, the design falls short of real life applications, as the circular wing and fan systems takes most of the available room.

Hovercrafts and lift platforms can be enhanced by (BL) and (CE) phenomena as presented in U.S. Pat. Nos. 6,082, 478, 6,616,094 and 7,581,608, with main focus on efficiency and stability.

Fluid jet blowing on open surface flying methods come with a circular shape, most common refer to as saucer. They require a combination of (CM), (BL) and (CE) phenomena for achieving lift and they are VTOL aircrafts with yet to be determined horizontal flying performances and major issues of stability. An early solution is proposed in U.S. Pat. No. 3,276,723, where a ducted fan is proving vertical thrust. In U.S. Pat. No. 4,433,819 a non-rotating center body is combined with a rotating outer body, resulting in an impractical flying saucer solution.

U.S. Pat. No. 5,054,713 introduces a spheroidal body that obtain lift from the fluid jets flowing on its upper surface. Following the same method, U.S. Pat. No. 6,270,036 shows a centrifugal airflow from the center of the circular aircraft creating lift on the upper surface. U.S. Pat. No. 7,857,256 improves on the method by maximizing the (CE) phenomena for better lift and US published patent application 2009/A0065649 presents a boundary layer control for the fluid jet that creates the lift.

US published patent application 2006/A0144994 introduces a homeostatic flying hovercraft with the same saucer shape. US published patent application 2010/0288889 creates a more general solution of a circular body, where any kind of fluid jet sources, including rockets, can be used to generate lift.

All the prior art solutions fell short of providing a practical car-like shaped aircraft, with VTOL capability and with maximized pay load room, easy to control by ordinary skilled people. Such flying device is high desirable for mass utilization and the present invention provides an effective solution.

BRIEF SUMMARY OF THE INVENTION

As presented in FIG. 1 and FIG. 2 related to airplane and helicopter ways of obtaining lift, the airflow generated by the thrust propeller is of the open kind, it starts and ends into the atmosphere. Therefore there is no way to recover any part of the energy used to create the fluid jet that generates or help to generate the vertical lift of the aircraft. In contrast, a closed fluid jet comes close to total energy recovery, as only the friction losses need, to be compensated; however, a closed fluid jet creates no lilt on the enclosing surfaces, because the resulting pressure differences are zero and there is no work applied to the outside medium.

It is the subject of this invention to introduce a semi-open fluid jet as a method of obtaining lift and to provide and embodiment for one of the multitude of apparatuses that can be derived. The active side of the fluid jet is exposed to the outside medium, generating a lift on the supporting surface depending on the speed of the fluid, based on Bernoulli law (BL), while the passive side of the fluid jet is completely enclosed and is guided to a return path for energy recovery. The power source for the fluid jet in the preferred embodiment comprises one or more high rpm compact ducted fans, completely contained inside of the jet containment body. It is understood that all variations implemented by those skilled in the field remain under the cover of this invention.

No moving parts are exposed to the outside. Furthermore, a grill like cover protects the active side of the fluid jet from the external bodies and eliminates the risks of injury and malfunction.

FIG. 3A presents a vertical cross-section and FIG. 3B presents a horizontal cross-section of a lifting surface, according to the principles of the present invention. A minimum of three independent controlled lifting surfaces have to be combine in order to provide stability to the aircraft. A number of permanent magnet brush-less electric motor fans generate the power for the fluid jet of each lifting surface; the light weight, compactness, efficiency and the speed of the control of the electric motors make them the preferred choice for the preferred embodiment of the invention.

Four such lifting surfaces are proposed for the preferred embodiment of the invention. FIG. 4A presents the top view and FIG. 4B presents the side view of the preferred embodiment of the lifting element, depicting a combination of four independently controlled lifting surfaces. The car-like looking aircraft is obtained in the preferred embodiment by attaching the lifting element to the top of the main cabin, which contained the energy tank (battery), control, system, driver and passengers'seats. FIG. 5A presents the side view and FIG. 5B presents top view of the preferred embodiment of the VTOL aircraft based on the semi-open fluid jet lifting method.

By independent control of the four lifting surfaces, the aircraft can take off and land vertically, can hover, rotate, and move forward and backward, to the left and to the right. It is understood that the main traveling mode of the aircraft is forward-moving; therefore its body outline is tailored to a corresponding aerodynamic shape. The driver and passenger seats, storage space and battery pack are placed in a car-like fashion, with all comfort and accessibility that it provides. Today's digital control and software advances, combined with gyroscopic guiding, motion sensing, GPS, sonar, radar and optic sensors give the proven ability of automatic vertical take off and landing for the herein aircraft and the capability of an easy driving by ordinary people.

DETAILED DESCRIPTION OF THE INVENTION

Figure 1:
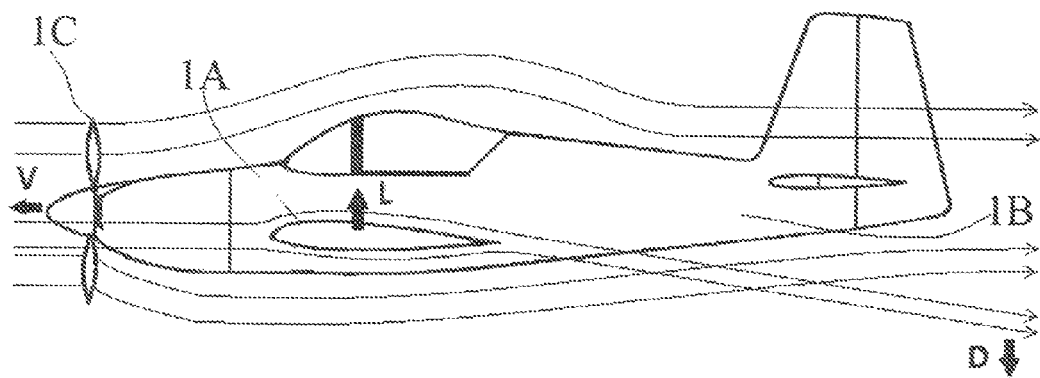
FIG. 1 is the side view of an airplane, as known in prior art.
Figure 2:
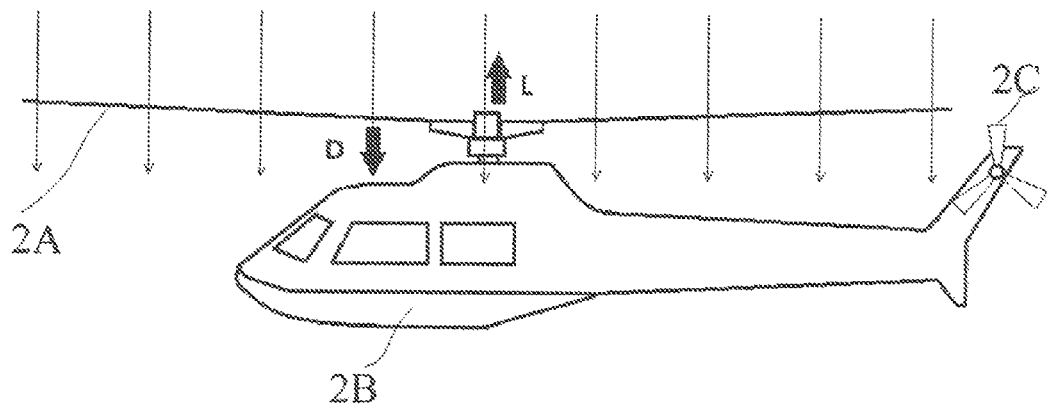
FIG. 2 is the side view of a helicopter, as known in prior art.
Figure 3A:
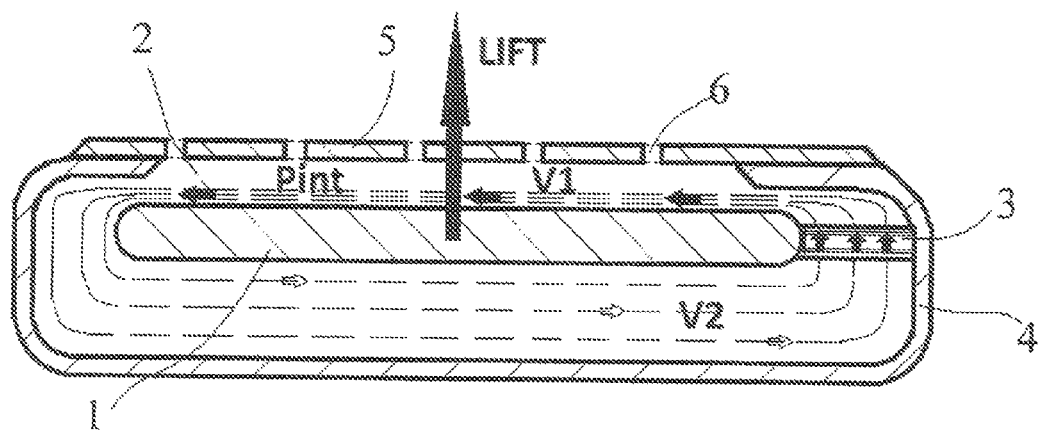
FIG. 3A is the vertical cross-section of the semi-open fluid jet lifting surface structure, subject of the invention.
Figure 3B:
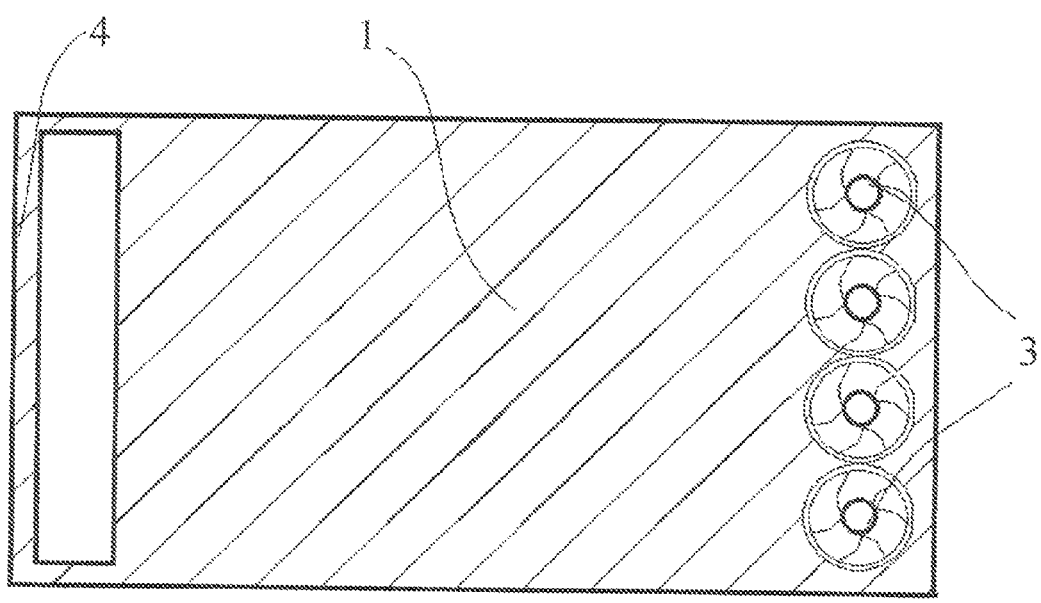
FIG. 3B is the horizontal cross-section of the semi-open fluid jet lifting surface structure, subject of the invention.

The present invention is a regenerative lift method, which in the preferred embodiment of the invention (as depicted in FIG. 3A and FIG. 3B) comprising a semi-open fluid jet 2 blowing with speed V1 on the open side of the lifting airfoil 1 and returning with speed V2 on the closed side of the said lifting airfoil 1, in a closed circuit. The said lifting airfoil 1 is rigidly joined on the sides to the containment body 4, transferring any lifting force from the lifting airfoil 1 to the said containment body 4, and the source of the fluid jet comprises in one or more ducted fans 3 placed inside of the fluid jet containment body 4, and fixed between the said lifting airfoil 1 and the said containment body 4.

In the preferred embodiment of the invention a grill like cover 5 is protecting the open side of the lifting airfoil 1 by rigidly connecting to the said containment body 4 at a reasonable distance from the fluid jet 2, for avoiding any interference with the said fluid jet 2, and permitting a free connection to the outside atmosphere through the openings 6 in the said grill cover 5.

The lifting force generated by the semi-open fluid jet on the open surface of the lifting airfoil 1 is proportional with the fluid density and the second power of the fluid speed V1 (dynamic pressure), as Bernoulli law requires when considering incompressible fluids and fluid speeds well under the speed of sound in the said fluid. It is proven in prior art that these conditions are met for air gas at sea level pressure for speed under 0.3 Mach (sound speed in air), resulting in a considerable lifting force capability (above 500 kg/m$^2$).

The grill cover 5 is placed far enough from the semi-open fluid jet 2 that the outside pressure is present all around the said cover grill 5 due to the openings 6, therefore no force is exerted on the said cover grill 5.

There is a zero force resulting on the closed path of the fluid jet, because the dynamic pressure generated by the thud jet 2 having the speed V2 leads to equal and opposite forces on the containment body 4 and the closed side of the lifting airfoil 1.

Figure 4A:
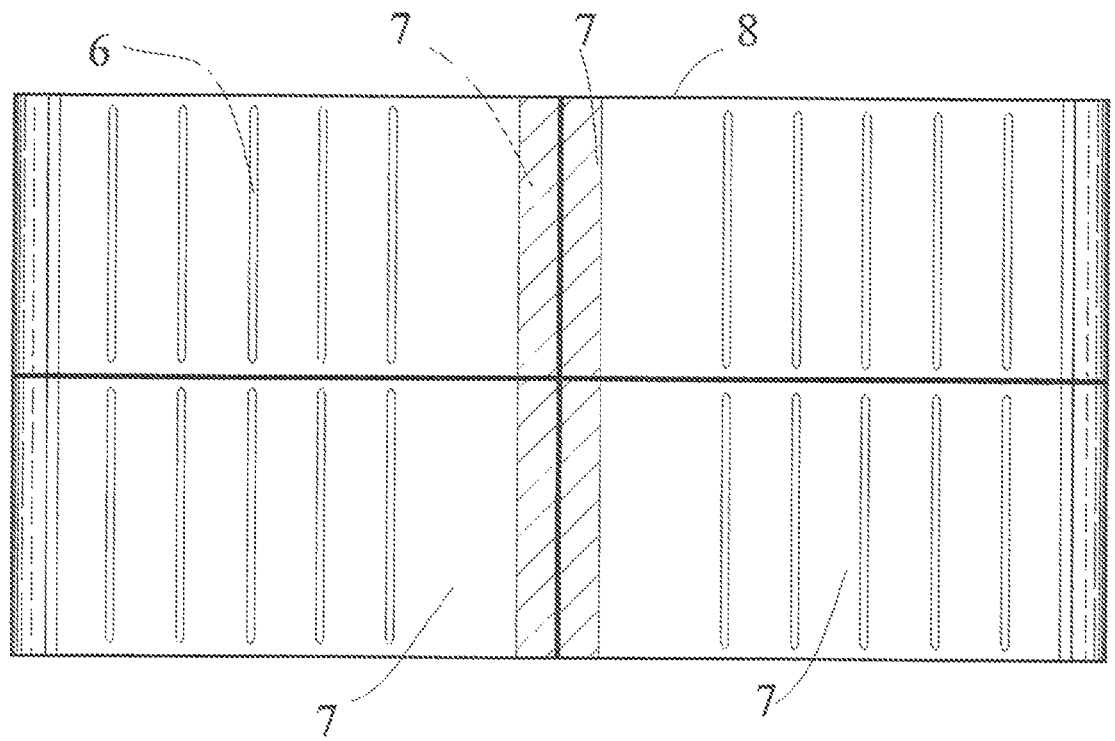
FIG. 4A is the top view of four joined semi-open fluid jet lifting surfaces, as the main lifting element subject of the invention.
Figure 4B:
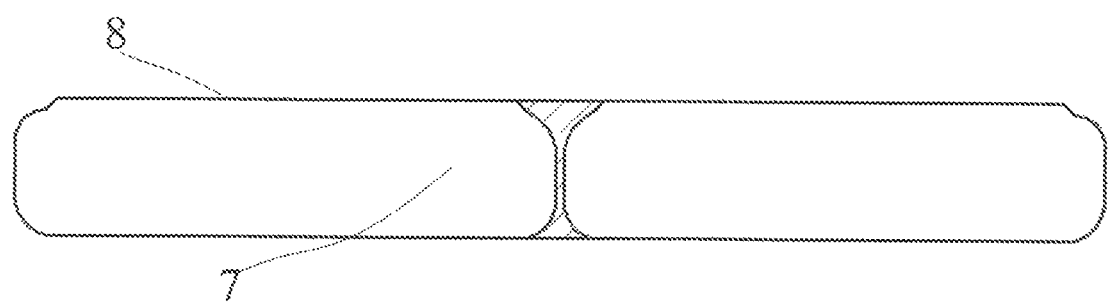
FIG. 4B is the side view of four joined semi-open fluid jet lifting surfaces, as the main lifting element subject of the invention.

The herein described semi-open fluid jet structure is the main lifting surface 7 of the preferred embodiment of the invention, and FIG. 4A and FIG. 4B show the lifting element 8 of the preferred embodiment of the invention, comprising of four independent controlled said lifting surfaces 7. It is understood that for those skilled in the field a control algorithm for obtaining vertical lift and landing, stable cruising, rotation and lateral maneuverability of the said lifting element 8 is achievable.

It is understood that the present invention is not limited to the preferred embodiment herein described and it is covering all the possible variations that may be derived by those skilled in the field.

Figure 5A:
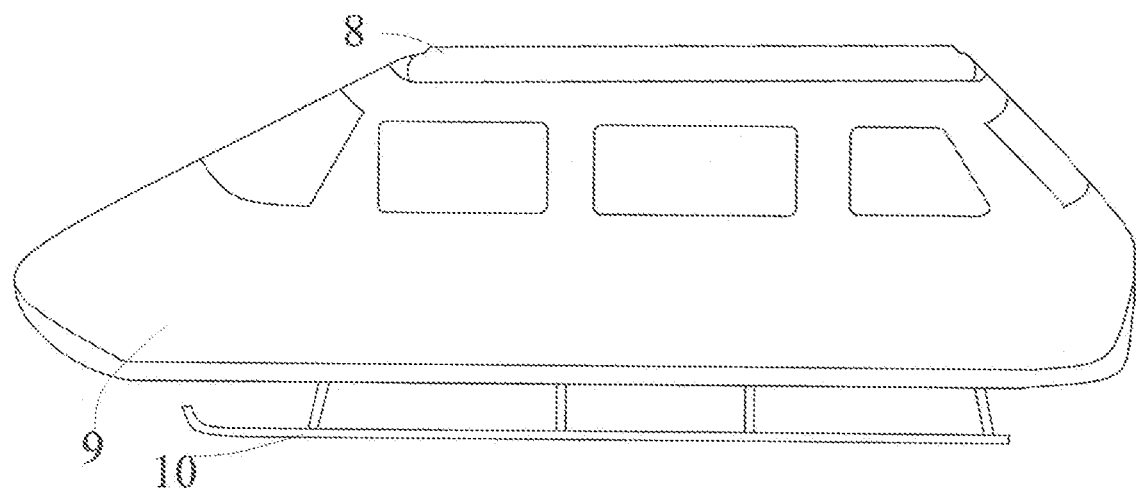
FIG. 5A is the side view of the preferred embodiment aircraft.
Figure 5B:
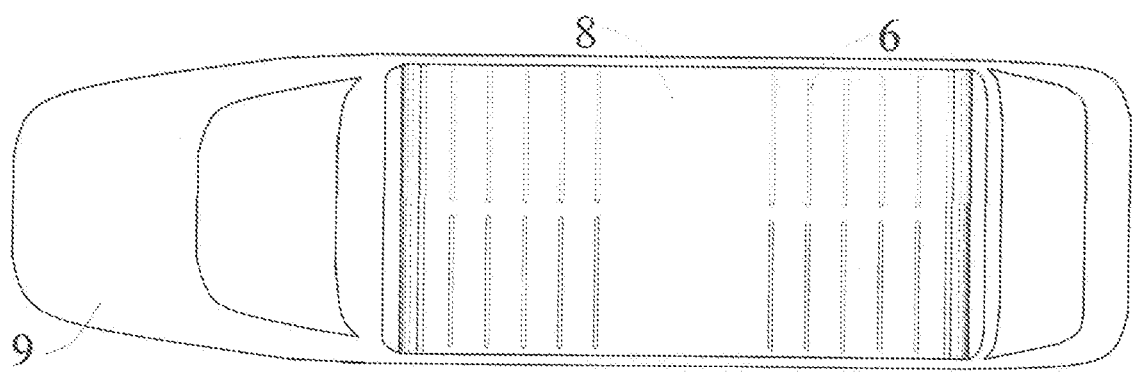
FIG. 5B is the top view of the preferred embodiment aircraft.

The use of the lifting element 8 is presented in the preferred embodiment of the semi-open fluid jet apparatus, namely a car-like looking aircraft, as presented in FIG. 5A and FIG. 5B, comprising but not limited to a cabin 9, a landing gear 10 placed on the bottom side of the said cabin 9, and a lifting element 8 placed on the top side of the said cabin 9. The said cabin 9 contains, but is not limited to, the energy tank (battery pack) and the control mechanism for the fans 3 of the lifting surfaces 7, the driver seat and gear, the passenger seats and gear, and the extra payload room.

It is understood that the main traveling mode of the aircraft is forward-moving; therefore the cabin 9 shape is tailored to a corresponding aerodynamic shape. It is also understood that the invention is not limited to the use of landing gear 10 of the preferred embodiment, and any other type of landing gear derived by those skilled in the fields is covered.

In the second preferred embodiment of the invention, the landing gear of the aircraft is of wheel type, allowing for land cruising, steering and maneuver, and using the lifting element 8 as a propulsion system.

In the third preferred embodiment of the present invention, the aircraft cabin 9 is water sealed and the landing gear is of retractable type, allowing for direct take off and landing on the water, and water cruising in an amphibious way, and using the lifting element 8 as a propulsion system.

The invention claimed is:

1. A system for a vehicle comprising: an airfoil wherein fluid is configured to flow over a top surface of the airfoil at a first speed and fluid is configured to flow below on a lower surface of the airfoil at a second speed on a return path;
   a safety cover configured to be positioned over the top surface of the airfoil, the safety cover including a plurality of openings;
   a containment body having a first end and a second end, the first end being positioned over a front end of the airfoil and below the safety cover, the second end being positioned over a rear end of the airfoil and below the safety cover, wherein a portion of the containment body wraps around the airfoil, wherein a first distance between the safety cover and the top surface of the airfoil is less than a second distance between the containment body and the lower surface of the airfoil;
   a plurality of duct fans positioned with the containment body between the rear end of the airfoil and the containment body.

2. The system of claim 1, further comprising:
   a first flow path positioned between the airfoil and the safety cover, the first flow path having the first speed;
   a second return flow path positioned between the airfoil and the containment body having the second speed, the second flow path being a closed return path.

3. The system of claim 2, wherein a zero force is applied on the closed path.

4. The system of claim 2, wherein the first flow path is an active path and the second return flow path is a passive return path.

5. The system of claim 4, wherein the plurality of duct fans are completely contained inside the containment body, and are configured to move fluid from the passive return path to the active path.

* * * * *